(12) United States Patent
Kwon et al.

(10) Patent No.: US 7,248,407 B2
(45) Date of Patent: Jul. 24, 2007

(54) MICROLENS ARRAY SHEET OF PROJECTION SCREEN, AND METHOD FOR MANUFACTURING THE SAME

(75) Inventors: Hyouk Kwon, Seoul (KR); Young-Joo Yee, Gyeonggi-Do (KR); Chang-Hoon Oh, Seoul (KR); Gun-Woo Lee, Daegu (KR); Ki-Won Park, Gyeonggi-Do (KR); Dong-Mug Seong, Gyeonggi-Do (KR)

(73) Assignees: LG Electronics Inc., Seoul (KR); LG Micron Ltd., Gyeongsang-Buk-Do (KR)

( * ) Notice: Subject to any disclaimer, the term of this patent is extended or adjusted under 35 U.S.C. 154(b) by 50 days.

(21) Appl. No.: 10/860,032

(22) Filed: Jun. 4, 2004

(65) Prior Publication Data

US 2004/0263967 A1 Dec. 30, 2004

(30) Foreign Application Priority Data

Jun. 24, 2003 (KR) ............... 10-2003-0041264
Jul. 1, 2003 (KR) ............... 10-2003-0044354
Sep. 15, 2003 (KR) ............... 10-2003-0063774

(51) Int. Cl.
*G03B 21/60* (2006.01)
*G02B 27/10* (2006.01)
(52) U.S. Cl. ................... 359/455; 359/628
(58) Field of Classification Search ........ 359/455–457, 359/628
See application file for complete search history.

(56) References Cited

U.S. PATENT DOCUMENTS

| 3,365,524 | A | | 1/1968 | Thomspon et al. |
| 4,443,814 | A | * | 4/1984 | Mori et al. ............ 359/456 |
| 4,525,029 | A | | 6/1985 | Inoue et al. |
| 5,475,533 | A | | 12/1995 | Steenblik et al. |
| 5,563,738 | A | | 10/1996 | Vance |
| 5,724,182 | A | * | 3/1998 | Mitani et al. ............ 359/457 |
| 5,870,224 | A | * | 2/1999 | Saitoh et al. ............ 359/456 |

(Continued)

FOREIGN PATENT DOCUMENTS

EP 0 733 938 A1 9/1996

(Continued)

*Primary Examiner*—Christopher Mahoney
(74) *Attorney, Agent, or Firm*—Birch, Stewart, Kolasch & Birch, LLP

(57) ABSTRACT

The present invention discloses a microlens array sheet of a projection screen including a lens sheet having a predetermined area, microlenses arranged on one surface of the lens sheet in the horizontal and vertical directions, a black matrix including apertures corresponding to the microlenses, and being adhered to the other surface of the lens sheet, an optical diffusing layer formed on the lens sheet to cover the black matrix, for widening a viewing angle, and a protecting film for protecting the optical diffusing layer. The microlens array sheet of the projection screen is manufactured by using a process for manufacturing a semiconductor device, a reflow process and a plating process for a mold, thereby improving luminance and definition of the projection screen at a low unit cost of production.

25 Claims, 10 Drawing Sheets

U.S. PATENT DOCUMENTS

| | | | |
|---|---|---|---|
| 6,335,828 B1* | 1/2002 | Hashimoto et al. | 359/457 |
| 6,594,079 B1* | 7/2003 | Trott et al. | 359/456 |
| 6,700,702 B2* | 3/2004 | Sales | 359/455 |
| 6,781,733 B1* | 8/2004 | Hira | 359/237 |
| 6,829,086 B1* | 12/2004 | Gibilini | 359/455 |
| 6,829,087 B2* | 12/2004 | Freese et al. | 359/455 |
| 6,862,139 B2* | 3/2005 | Chang et al. | 359/453 |
| 7,009,766 B2* | 3/2006 | Hirata et al. | 359/455 |
| 2001/0040263 A1* | 11/2001 | Nakai | 257/432 |
| 2002/0045028 A1 | 4/2002 | Teshima et al. | |
| 2006/0001965 A1* | 1/2006 | Ebina et al. | 359/457 |

FOREIGN PATENT DOCUMENTS

| | | |
|---|---|---|
| EP | 1 014 169 A1 | 6/2000 |
| JP | 56-140307 A | 11/1981 |
| JP | 59-29234 * | 2/1984 |
| JP | 60-76727 * | 5/1985 |
| JP | 5-2221 * | 1/1993 |
| JP | 2000-304906 A | 2/2000 |

\* cited by examiner 310  320

MICROLENS ARRAY SHEET OF PROJECTION SCREEN, AND METHOD FOR MANUFACTURING THE SAME

This Non-provisional application claims priority under 35 U.S.C. 119(a) on patent application Ser. No(s). 10-2003-0041264; 10-2003-0044354; and 10-2003-0063774 filed in Korea on Jun. 24, 2003; Jul. 01, 2003; and Sep. 15, 2003, the entire contents of which are hereby incorporated by reference.

BACKGROUND OF THE INVENTION

1. Field of the Invention

The present invention relates to a projection screen, and more particularly to, a microlens array sheet of a projection screen which can obtain horizontal and vertical viewing angles of an image formed on the projection screen, easily obtain fine pitches of unit lenses, achieve mass production, and reduce a unit cost of production, and a method for manufacturing the same.

2. Description of the Background Art

A projection TV system basically magnifies and projects a small image formed on a liquid crystal display (LCD) and a cathode ray tube (CRT), and forms the image on a projection screen, so that the user can watch a large screen. The projection TV system has been remarkably developed due to increase of the consumers wanting the large screen.

FIG. 1 is a perspective view illustrating one example of the projection screen.

Referring to FIG. 1, the projection screen includes a fresnel lens assembly 100 formed with a predetermined area, for horizontally inducing an image beam emitted from a projection lens in an observer direction, and focusing the image beam, and a lenticular lens array sheet 200 disposed adjacently to the fresnel lens assembly 100, for dispersing the image beam from the fresnel lens assembly 100.

The fresnel lens assembly 100 is comprised of a lens sheet having a predetermined thickness and area, and a fresnel lens 120 formed in a predetermined shape and adhered to the lens sheet 110. The fresnel lens assembly 100 is disposed in the projection lens side. The fresnel lens 120 includes a dispersing agent or dispersing layer. Dispersion of the projected image beam is varied according to a concentration of the dispersing agent or a thickness of the dispersing layer.

The lenticular lens array sheet 200 includes a plurality of lenticular lenses 220 arranging lenticular lenses which are cylindrical lenses 221 on one surface of a lens sheet 210 having a predetermined thickness and area, a black matrix 230 disposed on the other surface of the lens sheet 210, for forming optical apertures for emitting light, an optical diffusing layer 240 formed in the black matrix side, for widening a viewing angle, and a projecting film 250 for protecting the optical diffusing layer 240. As shown in FIG. 2, in the lenticular lenses 220, the cylindrical lenticular lenses 221 having a length equivalent to a length of the lens sheet 210 are arranged in a row.

In the projection screen, when an image beam is emitted from the projection lens, the emitted image beam is dispersed through the fresnel lens assembly 100, and more dispersed through the lenticular lens array sheet 200. The user can watch the projected image on the projection screen by the above procedure.

The projection screen employs the lenticular lens array sheet 200 to horizontally widen the viewing angle. In the case of a high definition projection TV such as an HDTV, pitches of the lenticular lenses 220 must be excessively reduced. Especially, in the case of a projection TV using an LCD, pixels of a liquid crystal panel and the lenticular lenses 220 are combined, to generate moiré patterns. For this, the pitches of the lenticular lenses 220 must be fine below a few hundreds micrometers.

A conventional method for manufacturing the lenticular lens array sheet 200 manufactures a mold having a lenticular lens shape by precise mechanical processing, and forms or injects a thermoplastic resin by using the mold, thereby manufacturing the lens sheet 210 on which the lenticular lenses 220 are arranged.

The conventional method for manufacturing the lenticular lens array sheet 200 fails to successfully obtain the fine pitches due to irregular heat distribution, and increases the manufacturing cost.

On the other hand, in the arrangement of the lenticular lenses 220, the cylindrical lenticular lenses 221 having one direction are arranged in a row. Therefore, a horizontal viewing angle can be widened, but a vertical viewing angle cannot be widened, which is only dependent upon the optical diffusing layer 240. As a result, techniques for simultaneously widening both the horizontal viewing angle and the vertical viewing angle, and fine lens arrangement are required to maintain high luminance and high definition.

SUMMARY OF THE INVENTION

Therefore, an object of the present invention is to provide a microlens array sheet of a projection screen which can form a bright high definition image by obtaining horizontal and vertical viewing angles of the image formed on the projection screen, and easily obtaining fine pitches of lenses, and a method for manufacturing the same.

Another object of the present invention is to provide a microlens array sheet of a projection screen which can achieve mass production and reduce a unit cost of production, and a method for manufacturing the same.

To achieve these and other advantages and in accordance with the purpose of the present invention, as embodied and broadly described herein, there is provided a microlens array sheet of a projection screen, including: a lens sheet having a predetermined area; microlenses arranged on one surface of the lens sheet in the horizontal and vertical directions; a black matrix including apertures corresponding to the microlenses, and being adhered to the other surface of the lens sheet; an optical diffusing layer formed on the lens sheet to cover the black matrix, for widening a viewing angle; and a protecting film for protecting the optical diffusing layer.

According to one aspect of the invention, a method for manufacturing a microlens array sheet of a projection screen includes the steps of: manufacturing a mold where concave curved surfaces corresponding to convex microlenses have been formed; forming the convex microlenses on one surface of a transparent sheet by compressing the transparent sheet by the mold; adhering an adhesive film having photosensitivity to the other surface of the sheet, and forming a black matrix by using the adhesive film; forming an optical diffusing layer on the sheet; and forming a protecting film thereon.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
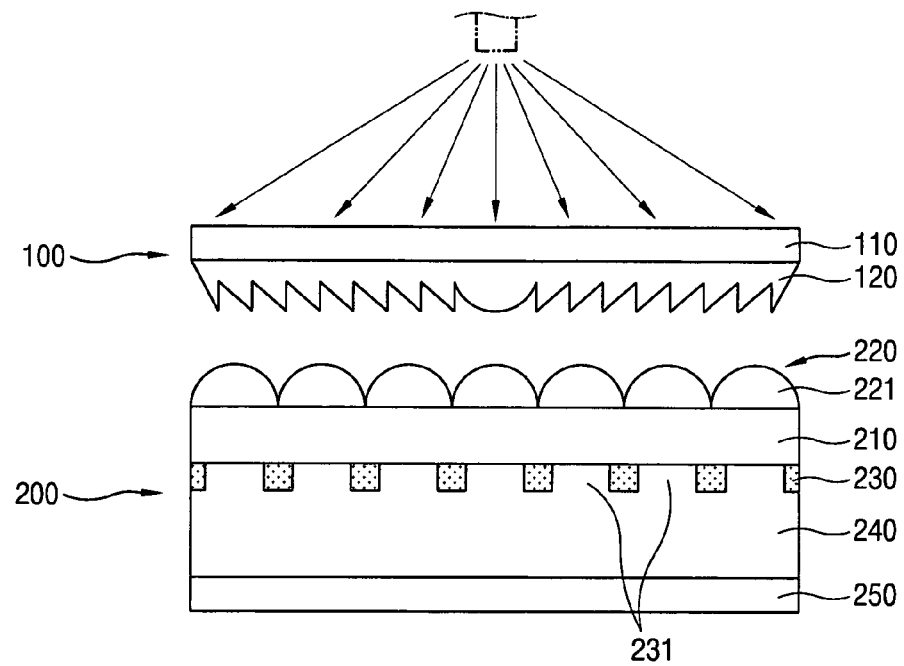
FIG. 1 is a plane-sectional view illustrating a conventional projection screen.
Figure 2:
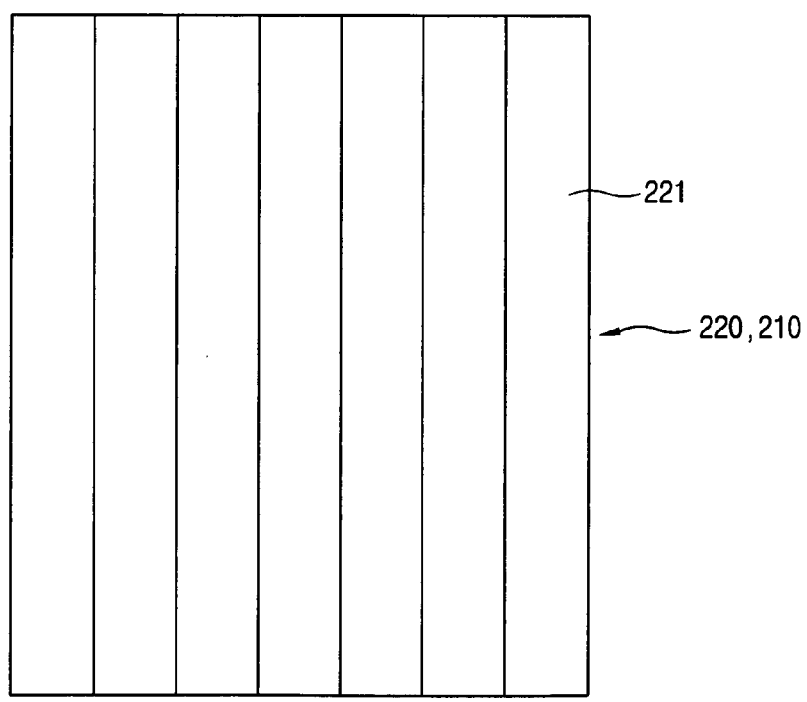
FIG. 2 is a plane view illustrating lenticular lens arrangement of the conventional projection screen.
Figure 3:
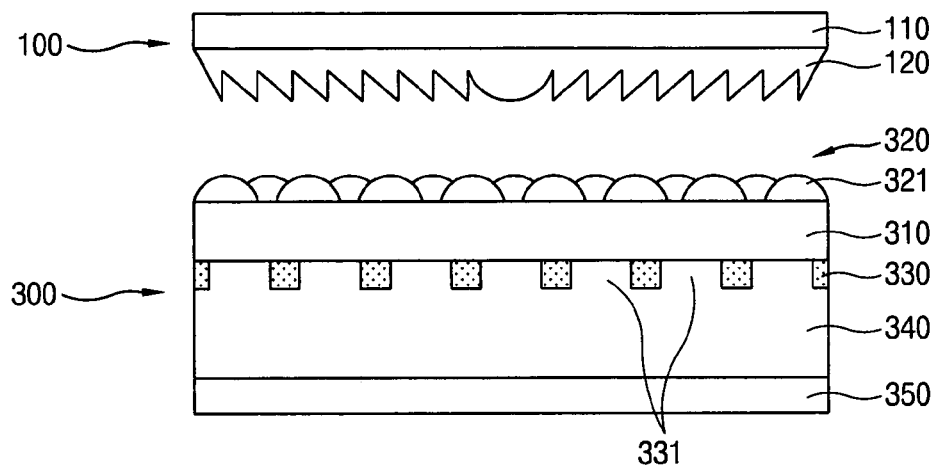
FIG. 3 is a plane-sectional view illustrating a projection screen including a microlens array sheet in accordance with an embodiment of the present invention.
Figure 4:
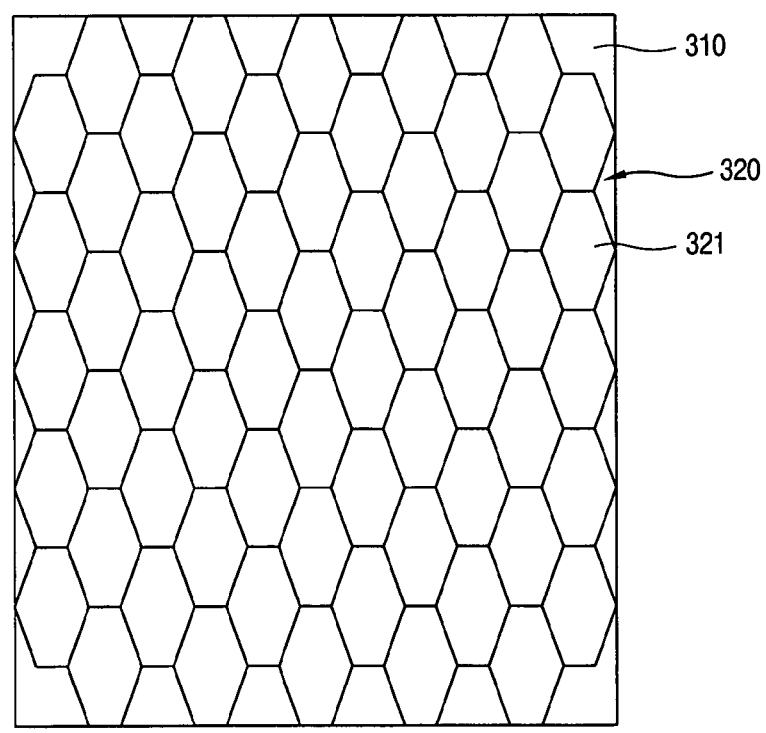
FIG. 4 is a front view illustrating the microlens array sheet of the projection screen in accordance with an embodiment of the present invention.

A microlens array sheet of a projection screen and a method for manufacturing the same in accordance with the present invention will now be described in detail with reference to the accompanying drawings. FIG. 3 is a plane-sectional view illustrating the projection screen including the microlens array sheet in accordance with an embodiment of the present invention, and FIG. 4 is a front view illustrating the microlens array sheet in accordance with an embodiment of the present invention. In the following description, same drawing reference numerals are used for the same elements even in different drawings.

As illustrated in FIG. 3, the projection screen includes a fresnel lens assembly 100 for horizontally inducing an image beam emitted from a projection lens in an observer direction, and focusing the image beam, and a microlens array sheet 300 disposed adjacently to the fresnel lens assembly 100, for dispersing the image beam from the fresnel lens assembly 100. The structure of the fresnel lens assembly 100 is similar to the structure of the conventional fresnel lens assembly 100 described above.

The microlens array sheet 300 includes a lens sheet 310 formed in a rectangular shape with a predetermined area, microlenses 320 arranged on one surface of the lens sheet 310 in the horizontal and vertical directions, a black matrix 330 including apertures corresponding to the microlenses 320, and being adhered to the other surface of the lens sheet 310, an optical diffusing layer 340 formed on the lens sheet 310 to cover the black matrix 330, for widening a viewing angle, and a protecting film 350 for protecting the optical diffusing layer 340.

Preferably, the lens sheet 310 is comprised of a transparent resin sheet. The microlenses 320 are extended and protruded from one surface of the lens sheet 310. The lens sheet 310 and the microlenses 320 are formed by using one of silicon, glass, metal and organic substance polymer.

Each of the microlenses 320 is formed in a hexagonal shape. The microlenses 320 are arranged to fill the lens sheet 310 as much as possible. A vertical length of each of the microlenses 320 is larger than a horizontal length thereof. The hexagonal microlenses 320 are regularly arranged in the horizontal and vertical directions.

The microlenses 320 are formed in a convex curved surface shape having a convex center, respectively. Preferably, the microlenses 320 formed in the convex curved surface shape have different top, bottom, right and left curvatures from their centers.

Figure 5:
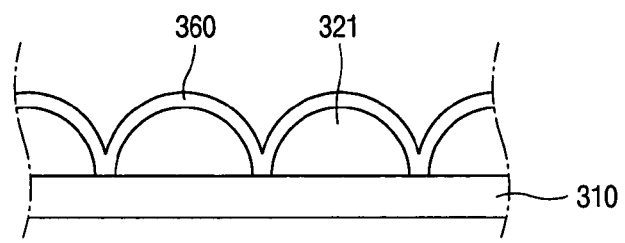
FIG. 5 is a plane-sectional view illustrating a filling film of the microlens array sheet of the projection screen in accordance with an embodiment of the present invention.

When fine intervals are generated between the microlenses 320, as shown in FIG. 5, a filling film 360 is formed to fill the intervals between the microlenses 320. The filling film 360 is formed on the microlenses 320 at a predetermined thickness.

The filling film 360 is a metal film formed by electroplating or electroless-plating.

Another examples of the filling film 360 include a metal film and an organic substance polymer film formed by sputtering or evaporation. Yet another examples of the filling film 360 include an oxide film and a nitride film formed by chemical vapor deposition (CVD). Yet another examples of the filling film 360 include an organic substance polymer film formed by spin coating or spray coating.

Figure 6:
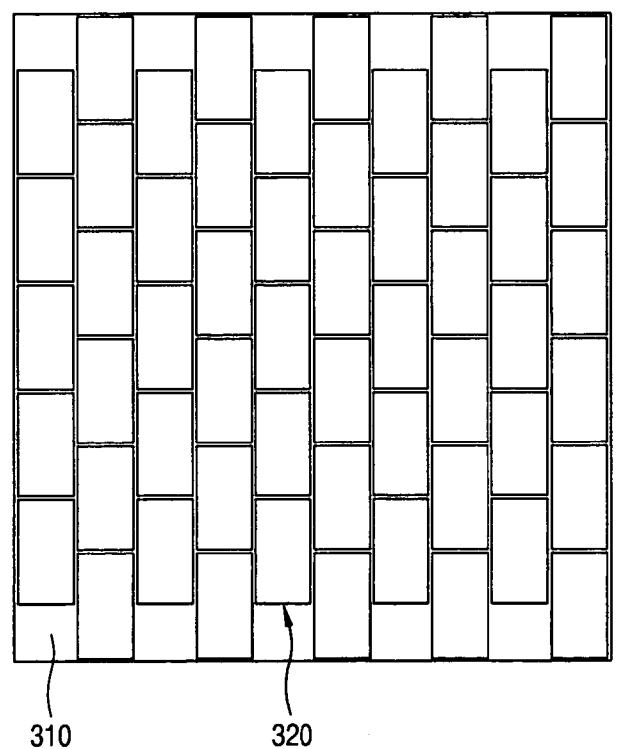
FIGS. 6 and 7 are front views illustrating the microlens array sheet of the projection screen in accordance with other embodiments of the present invention.

As another example of the microlenses 320 formed on one surface of the lens sheet 310, as depicted in FIG. 6, each of the microlenses 320 is formed in a rectangular shape. A vertical length of the microlenses 320 is larger than a horizontal length thereof. The rectangular microlenses 320 are regularly arranged in the horizontal and vertical directions to fill the lens sheet 310 as much as possible.

The microlenses 320 are formed in a convex curved surface shape having a convex center, respectively. When fine intervals are generated between the microlenses 320, a filling film is formed to fill the intervals between the microlenses 320. The method for forming the filling film has been described above.

As yet another example of the microlenses 320, each of the microlenses 320 is formed in a polygonal shape including a pentagonal shape. The polygonal microlenses 320 are regularly arranged in the horizontal and vertical directions to fill the lens sheet 310 as much as possible.

Figure 7:
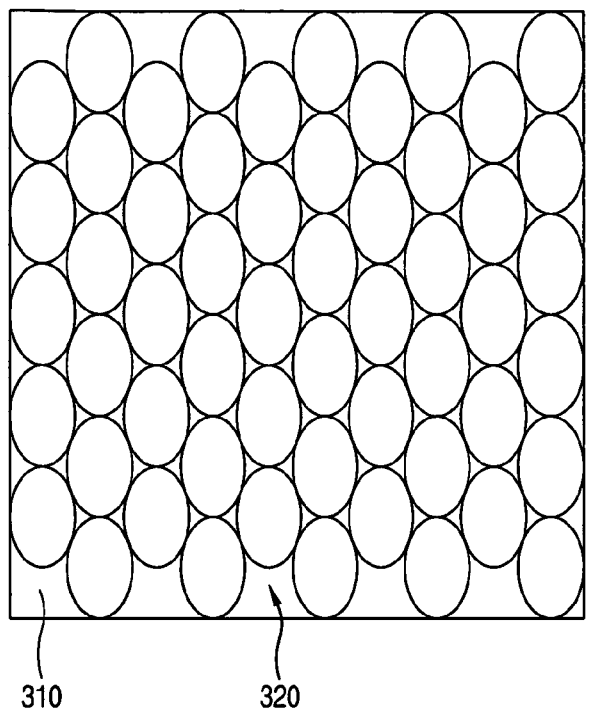

As yet another example of the microlenses 320, as shown in FIG. 7, each of the microlenses 320 is formed in an elliptical shape. The elliptical microlenses 320 are regularly arranged in the horizontal and vertical directions to fill the lens sheet 310 as much as possible.

The microlenses 320 are formed in a convex curved surface shape having a convex center, respectively. When fine intervals are generated between the microlenses 320, a filling film is formed to fill the intervals between the microlenses 320. The method for forming the filling film has been described above.

The black matrix 330 including optical apertures for emitting light is adhered to the other surface of the lens sheet 310. The black matrix 330 is adhered to the opposite surface to the surface on which the microlenses 320 have been formed.

The optical diffusing layer 340 for widening the viewing angle is formed on the lens sheet 310 at a predetermined thickness. The protecting film 350 for protecting the optical diffusing layer 340 is adhered thereto. The optical diffusing layer 340 is formed to cover the black matrix 330. The protecting film 350 is comprised of a transparent resin sheet, for preventing static electricity and reflection of light.

Figure 8:
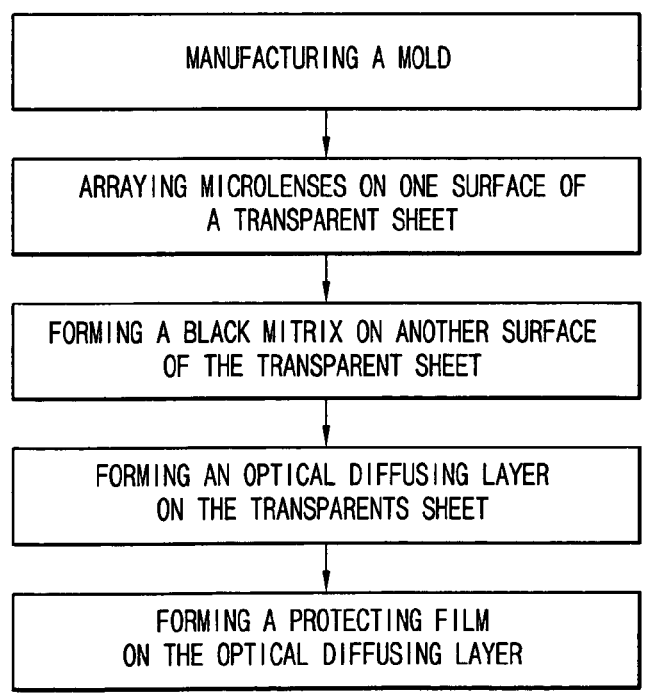
FIG. 8 is a flowchart showing sequential steps of a method for manufacturing a microlens array sheet of a projection screen in accordance with a preferred embodiment of the present invention.

FIG. 8 is a flowchart showing sequential steps of a method for manufacturing a microlens array sheet of a projection screen in accordance with a preferred embodiment of the present invention.

Referring to FIG. 8, the method for manufacturing the microlens array sheet of the projection screen includes the steps of manufacturing a mold where concave curved surfaces corresponding to convex microlenses 320 have been formed, forming the convex microlenses 320 on one surface of a transparent sheet by compressing the transparent sheet by the mold, adhering an adhesive film having photosensitivity to the other surface of the sheet and forming a black matrix by using the adhesive film, forming an optical diffusing layer on the sheet, and forming a protecting film thereon.

Figure 9:
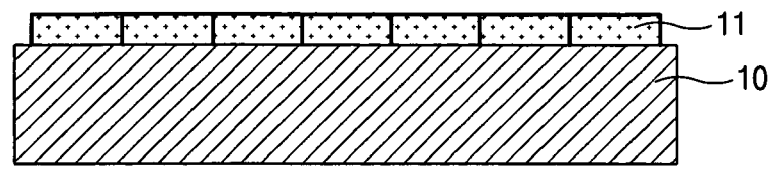
FIGS. 9 to 16 are front views illustrating sequential steps of a process for manufacturing the microlens array sheet of the projection screen in accordance with other embodiments of the present invention.

As one example of a method for manufacturing the mold, as shown in FIG. 9, a photosensitive film 11 is formed by coating a photosensitizer on a substrate 10 having a predetermined thickness and area, and patterns of a photo mask are transferred to the photosensitive film 11 by using the patterned photo mask and ultraviolet rays. The patterns of the photo mask are formed by the optical design in order to manufacture the mold having the lens array shape. The patterns formed on the photosensitive film 11 divide the photosensitive film 11 into a plurality of fine regions. Here, the fine regions are arranged in the horizontal and vertical directions.

Figure 10:
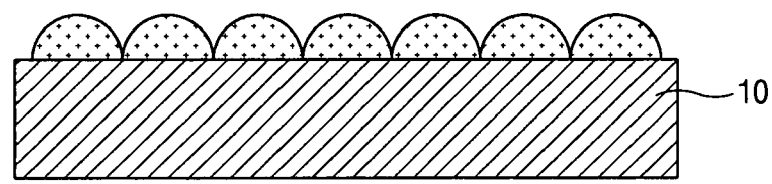

As illustrated in FIG. 10, each of the fine regions patterned on the photosensitive film 11 is formed in a convex spherical microlens array shape by using reflow techniques. The reflow techniques heat a transparent polymer material over a glass transition temperature, and form a curved surface having a predetermined curvature by surface tension from the polymer material. The surface of the spherical microlens array shape can be changed by etching techniques.

Figure 11:
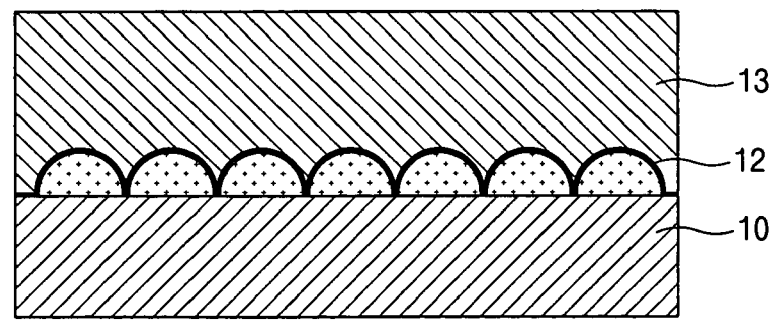
Figure 12:
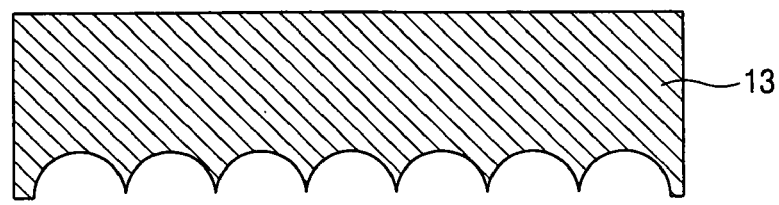

As depicted in FIG. 11, a metal thin film 12 which is a seed layer is deposited on the microlens array shape formed by the photosensitive film 11, and a mold 13 is manufactured in a plating mold formed by the microlens array shape and the seed layer. A concave curved surface array corresponding to the microlens array shape is formed on one surface of the mold 13 by the microlens array shape.

The metal thin film 12 is comprised of chrome or gold, and deposited according to a method used in a process for manufacturing a semiconductor device.

The mold 13 is manufactured by electro-plating or electroless-plating a metal suitable for the purpose of the mold 13 such as nickel on the plating mold. The mold 13 is separated from the substrate 10 and processed by chemical or mechanical polishing.

Figure 13:
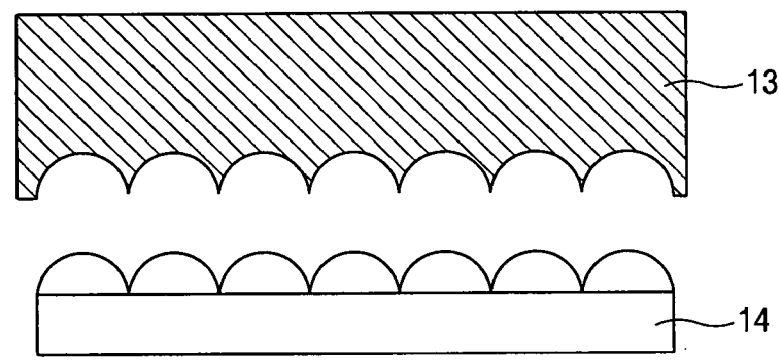

As illustrated in FIG. 13, microlenses are formed on a transparent resin 14 by using the mold 13. The transparent resin 14 is a material suitable for formation processing. Here, silicon and glass can replace the transparent resin 14.

Figure 14:
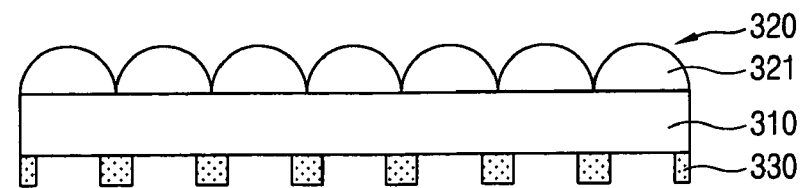

As shown in FIG. 14, a black matrix 330 is formed on the transparent resin 14 on which the microlenses have been formed. In order to form the black matrix 330, ultraviolet rays are irradiated to the transparent resin 14. The ultraviolet rays radiation-cure the condensed part of the adhesive film to remove adhesiveness from the condensed part. A black coating agent is coated on the adhesive film, and thus adhered to the residual adhesive part of the adhesive film, thereby forming the black matrix 330.

Figure 15:
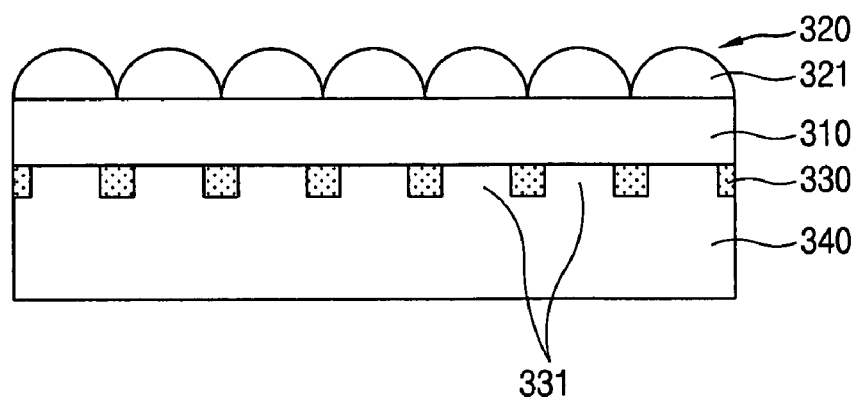
Figure 16:
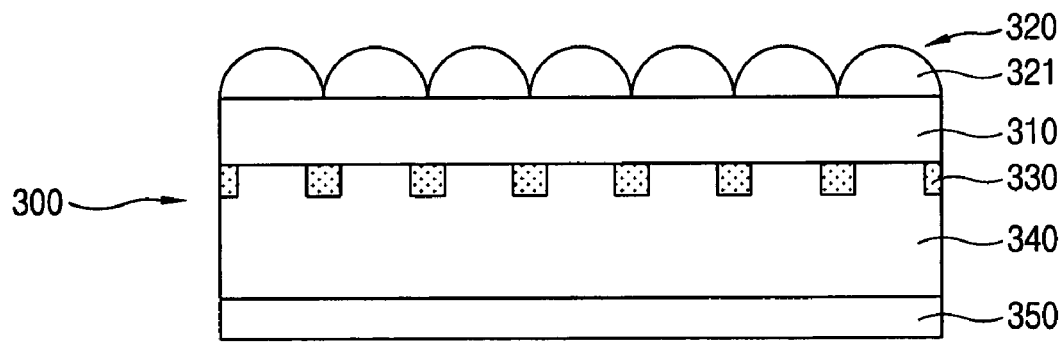
Figure 17:
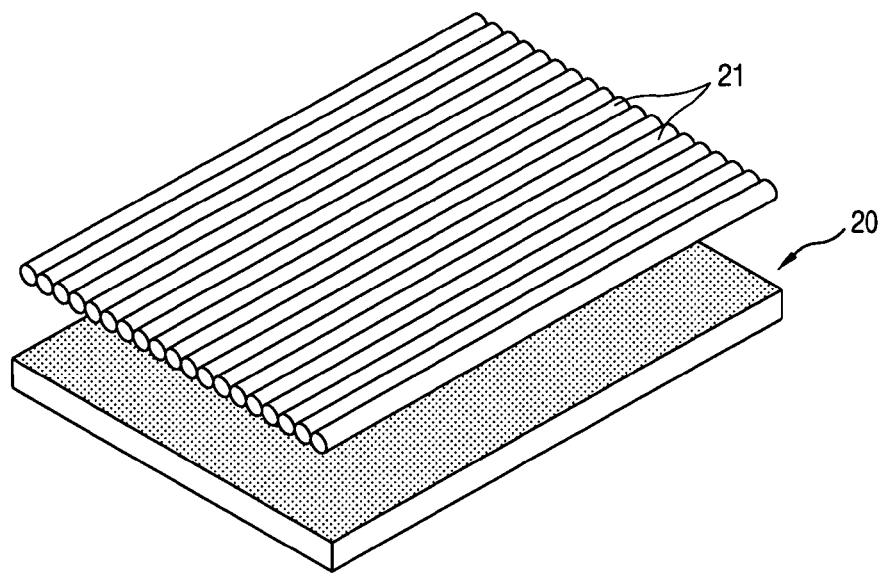
FIGS. 17 to 20 are perspective views illustrating sequential steps of another example of the process for manufacturing the microlens array sheet of the projection screen in accordance with an embodiment of the present invention.
Figure 18:
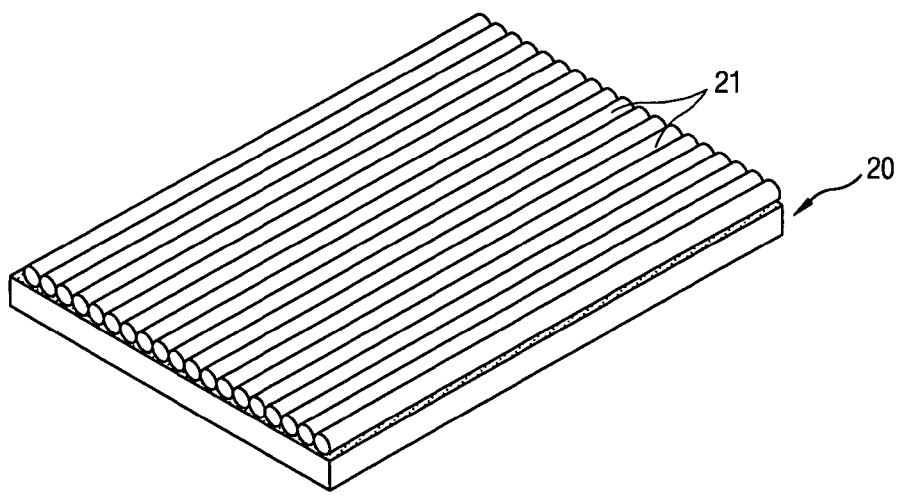
Figure 19:
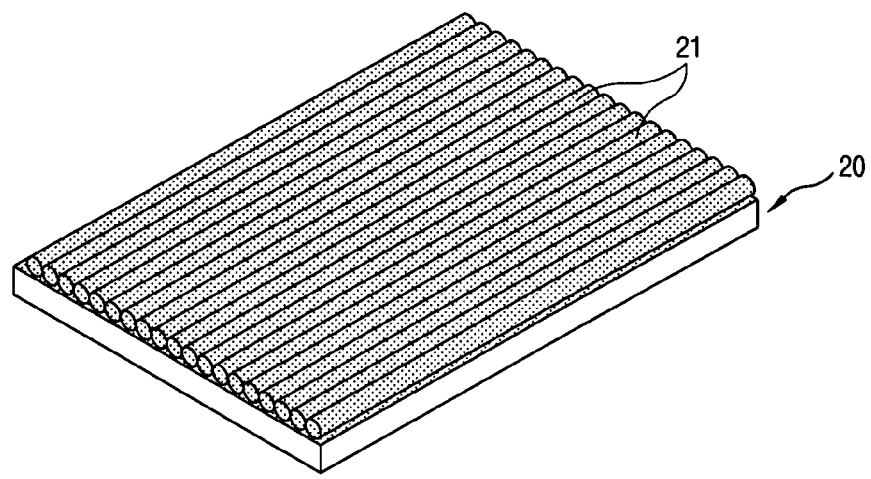
Figure 20:
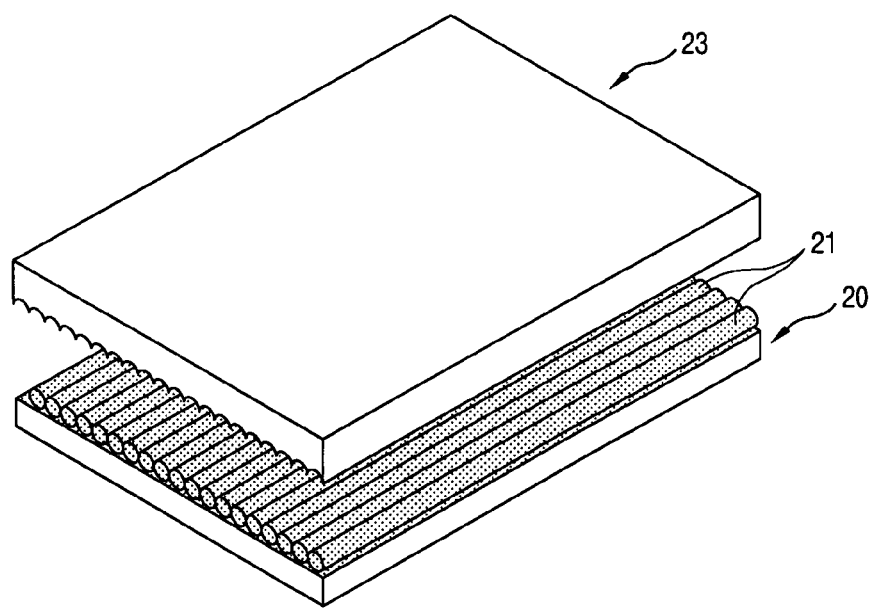

Referring to FIGS. 15 and 16, an optical diffusing layer 340 is formed on the transparent resin 14, and a protecting film 350 is formed on the optical diffusing layer 340. The protecting film 350 is comprised of a transparent resin film having functions of preventing static electricity and reflection of light.

On the other hand, referring to FIGS. 17 to 20, another example of the method for manufacturing the mold includes the steps of arranging and fixing a plurality of cylindrical fibers 21 on a substrate 20, depositing a metal thin film which is a seed layer on the plurality of cylindrical fibers 21 arranged on the substrate 20, forming a mold 23 by plating a metal on the metal seed layer, and separating the mold 23 from the substrate 20.

Figure 21:
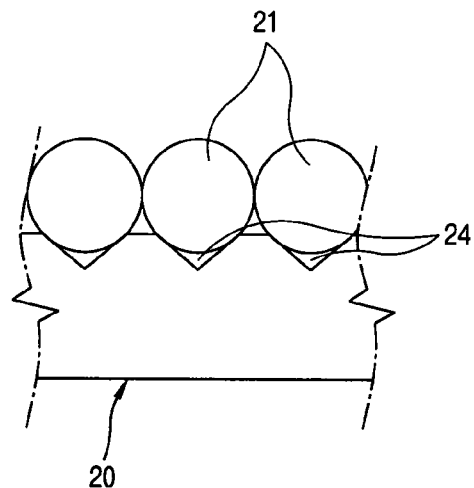
FIG. 21 is a front view illustrating grooves formed on a substrate.

As shown in FIG. 21, grooves 24 are preferably formed on the substrate 20 so that the cylindrical fibers 21 can be disposed thereon. The grooves 24 are formed on the substrate 20 in the longitudinal direction with a predetermined width and depth.

The cylindrical fibers 21 are optical fibers or metal wires. The cylindrical fibers 21 are adhesively arranged on the substrate 20 by a pair of rollers (not shown) and a guide plate (not shown).

The cylindrical fibers 21 are fixed to the substrate 20 by a sticky material. That is, the sticky material is coated on the substrate 20, and the cylindrical fibers 21 are arranged on the substrate 20 coated with the sticky material and adhered to the substrate 20 by the sticky material.

Preferably, the mold 23 is separated from the substrate 20 and processed by chemical or mechanical polishing.

The operational effects of the microlens array sheet of the projection screen and the method for manufacturing the same in accordance with the present invention will now be explained.

When the image beam is emitted from the projection lens, the emitted image beam is dispersed through the fresnel lens assembly 100, and more dispersed through the microlens array sheet 300.

Figure 22:
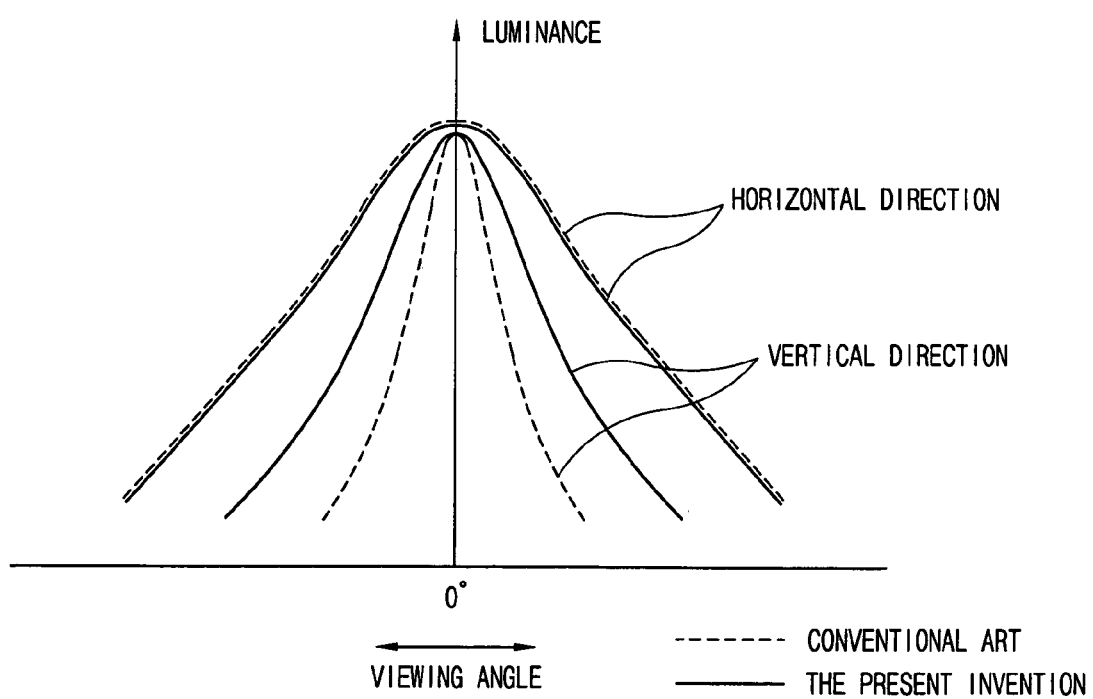
FIG. 22 is a graph showing horizontal and vertical viewing angles in the conventional art and an embodiment of the present invention.

The microlenses 320 are formed on the microlens array sheet 300 in a hexagonal shape and arranged in the horizontal and vertical directions, and thus the horizontal viewing angle of the microlenses 320 as well as the vertical viewing angle thereof are remarkably improved. FIG. 22 is a graph showing horizontal and vertical viewing angles in the conventional cylindrical lens arrangement and the hexagonal microlens arrangement of the present invention.

Even if the microlenses 320 are formed in a rectangular or elliptical shape, the horizontal and vertical viewing angles of the microlenses 320 are considerably improved.

In addition, the microlenses 320 are arranged on the lens sheet 310 as densely as possible, to increase fill factors and obtain fine pitches. In the case that intervals are generated between the microlenses 320 because of limited manufacturing techniques during the process for manufacturing the microlenses 320, the filling film 360 is formed on the intervals, to improve the fill factors.

In accordance with the present invention, the method for manufacturing the microlens array sheet of the projection screen uses the process for manufacturing the semiconductor device, the reflow process and the plating process for the mold, thereby processing the fine microlenses 320 at a low manufacturing cost and improving shape uniformity of the microlenses 320. Moreover, the transparent sheet on which the microlens array has been formed is manufactured by using the mold, which results in mass production.

On the other hand, when the mold is manufactured by using the cylindrical fibers, the lenticular lens shape is obtained as in the conventional art. Nevertheless, the fine pitches are obtained, the process for manufacturing the mold is simplified, and the unit cost of production is reduced.

As discussed earlier, in accordance with the present invention, the microlens array sheet of the projection screen and the method for manufacturing the same increase the horizontal and vertical viewing angles to improve optical luminance, and maximize the fill factors to improve optical efficiency.

Furthermore, the microlenses 320 are fine, and the pitches which are the intervals between the microlenses 320 are fine, to improve definition, achieve mass production, and reduce the unit cost of production. As a result, competitiveness of the products can be improved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A microlens array sheet of a projection screen, comprising:
   a lens sheet having a predetermined area;
   microlenses arranged on one surface of the lens sheet in the horizontal and vertical directions;
   a black matrix including apertures corresponding to the microlenses, and being adhered to the other surface of the lens sheet;
   an optical diffusing layer formed on the lens sheet to cover the black matrix, for widening a viewing angle; and
   a protecting film for protecting the optical diffusing layer.

2. The microlens array sheet of claim 1, wherein the microlenses are regularly arranged in the horizontal and vertical directions.

3. The microlens array sheet of claim 1, wherein each of the microlenses is formed in a polygonal shape.

4. The microlens array sheet of claim 3, wherein a vertical length of each of the microlenses is larger than a horizontal length thereof.

5. The microlens array sheet of claim 1, wherein each of the microlenses is formed in an elliptical shape.

6. The microlens array sheet of claim 1, wherein each of the microlenses is formed in a convex curved surface shape having a convex center.

7. The microlens array sheet of claim 6, wherein each of the microlenses has different top, bottom, right and left curvatures from their centers.

8. The microlens array sheet of claim 1, wherein a filling film for filling intervals between the microlenses is formed on outer surfaces of the microlenses.

9. The microlens array sheet of claim 8, wherein the filling film is a metal film formed by electro-plating or electroless-plating.

10. The microlens array sheet of claim 8, wherein the filling film is a metal film or an organic substance polymer film formed by sputtering or evaporation.

11. The microlens array sheet of claim 8, wherein the filling film is an oxide film or a nitride film formed by chemical vapor deposition.

12. The microlens array sheet of claim 8, wherein the filling film is an organic substance polymer film formed by spin coating or spray coating.

13. The microlens array sheet of claim 1, wherein the one surface of the lens sheet on which the microlenses are arranged is substantially planar.

14. The microlens array sheet of claim 1, wherein a curvature of the microlenses along one direction is different than a curvature of the microlenses along a different direction.

15. The microlens array sheet of claim 1, wherein the microlenses are all substantially a same size.

16. A microlens array sheet of a projection screen, comprising:
   a lens sheet having a predetermined area; and
   microlenses arranging honeycomb shaped microlenses on one surface of the lens sheet in the horizontal and vertical directions, said honeycomb shaped microlenses having six sides including two sides that are shorter in length than the other four sides,
   wherein the one surface of the lens sheet on which the microlenses are arranged is substantially planar.

17. The microlens array sheet of claim 16, further comprising a black matrix directly on an opposite surface of the lens sheet, the black matrix including apertures corresponding to each microlens.

18. The microlens array sheet of claim 16, wherein a curvature of the microlenses along one direction is different than a curvature of the microlenses along a different direction.

19. The microlens array sheet of claim 16, wherein the microlenses are regularly arranged in the horizontal and vertical directions.

20. The microlens array sheet of claim 16, wherein the microlenses are all substantially a same size.

21. A microlens array sheet of a projection screen, comprising:
   a lens sheet having a predetermined area;
   a plurality of honeycomb shaped microlenses arranged on a first surface of the lens sheet in the horizontal and vertical directions; and
   a black matrix including apertures corresponding to the microlenses, directly adhered to a second surface of the lens sheet, wherein the second surface is opposite the first surface,
   wherein said honeycomb shaped microlenses have six sides including two sides that are shorter in length than the other four sides.

22. The microlens array sheet of claim 21, wherein a curvature of the microlens in the a first direction is different from the curvature of the lens in the a second direction.

23. The microlens array sheet of claim 21, further comprising a filling film formed over outer surfaces of the microlenses.

24. The microlens array sheet of claim 21, wherein the microlenses are regularly arranged in the horizontal and vertical directions.

25. The microlens array sheet of claim 21, wherein the microlenses are all substantially a same size.

* * * * *